US007126628B2

(12) United States Patent
Liu

(10) Patent No.: US 7,126,628 B2
(45) Date of Patent: Oct. 24, 2006

(54) SCREW AUTO-DETECTION AND SELECTION DEVICE

(76) Inventor: Ying-Chung Liu, 235 Chung-Ho Box 8-24, Taipei (TW)

( * ) Notice: Subject to any disclaimer, the term of this patent is extended or adjusted under 35 U.S.C. 154(b) by 687 days.

(21) Appl. No.: 10/452,445

(22) Filed: May 27, 2003

(65) Prior Publication Data

US 2003/0222979 A1 Dec. 4, 2003

(51) Int. Cl.
*H04N 7/18* (2006.01)
*H04N 9/47* (2006.01)

(52) U.S. Cl. ........................................................ 348/92

(58) Field of Classification Search .................. 348/86, 348/87, 88, 92, 125; 356/445, 607; 209/538; 29/705; H04N 7/18, 9/47

See application file for complete search history.

(56) References Cited

U.S. PATENT DOCUMENTS 4,472,056 A * 9/1984 Nakagawa et al. ......... 356/607
4,527,326 A * 7/1985 Kohno et al. ................. 29/705
4,869,813 A * 9/1989 Bailey et al. ............... 209/538
5,940,173 A * 8/1999 Tomii et al. ................ 356/445

* cited by examiner

*Primary Examiner*—Tung Vo

(57) ABSTRACT

A screw auto-detection and selection device comprises a rotary machine table; a light source generating unit; a recording control unit; a camera detecting unit; and a time scale cam unit. The feature of device is that the camera detecting unit includes a press, an ejecting and a second camera detector. The press has a press arm extending above the notch of the dispatching disk and an elastic press installed at a predetermined position of the press arm. An ejecting has an ejecting pin and a movement limiting unit for ejecting a screw pressed by the press arm so that the screw is aligned to a radiating hole of the light source generating unit.

9 Claims, 9 Drawing Sheets

SCREW AUTO-DETECTION AND SELECTION DEVICE

FIELD OF THE INVENTION

The present invention relates to screw testing, and particularly to a screw auto-detection and selection device which can photograph screws for detection.

BACKGROUND OF THE INVENTION

In the prior art, the screw selection device includes a machine table, a driving means, a material selection device, a pinhole depth selection device and a camera detector. The material selection device, pinhole depth selection device and camera detector are installed on the machine table for detecting and selecting screws passing through the machine table. Other than the camera detector, all the detecting units are mechanical controlled. For example, the pinhole depth detecting unit uses a probe to detect the pinhole depth of a screw nut to determine whether it matches to a standard value.

In above mentioned prior art technology, the screw image is captured from a lateral side of the machine table by the camera detector. In photograph, the nut of the screw is supported by a receiving hole at an edge of a material receiving ring. However, this is only suitable for larger or longer screws and is not suitable for small screws which is commonly used in electronic products. This is because the small screws can not protrude out of the receiving hole for image capture. As a result, auto-selection and detection can not be performed.

SUMMARY OF THE INVENTION

Accordingly, the primary object of the present invention is to provide a screw auto-detection and selection device which comprises a rotary machine table, a light source generating unit; a recording control unit; a camera detecting unit; and a time scale cam unit. The feature of device is that the camera detecting unit includes a press means, an ejecting means and a second camera detector. The press means has a press arm extending above the notch of the dispatching disk and an elastic press installed at a predetermined position of the press arm. An ejecting means has an ejecting pin and a movement limiting unit for ejecting a screw pressed by the press arm so that the screw is aligned to a radiating hole of the light source generating unit.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
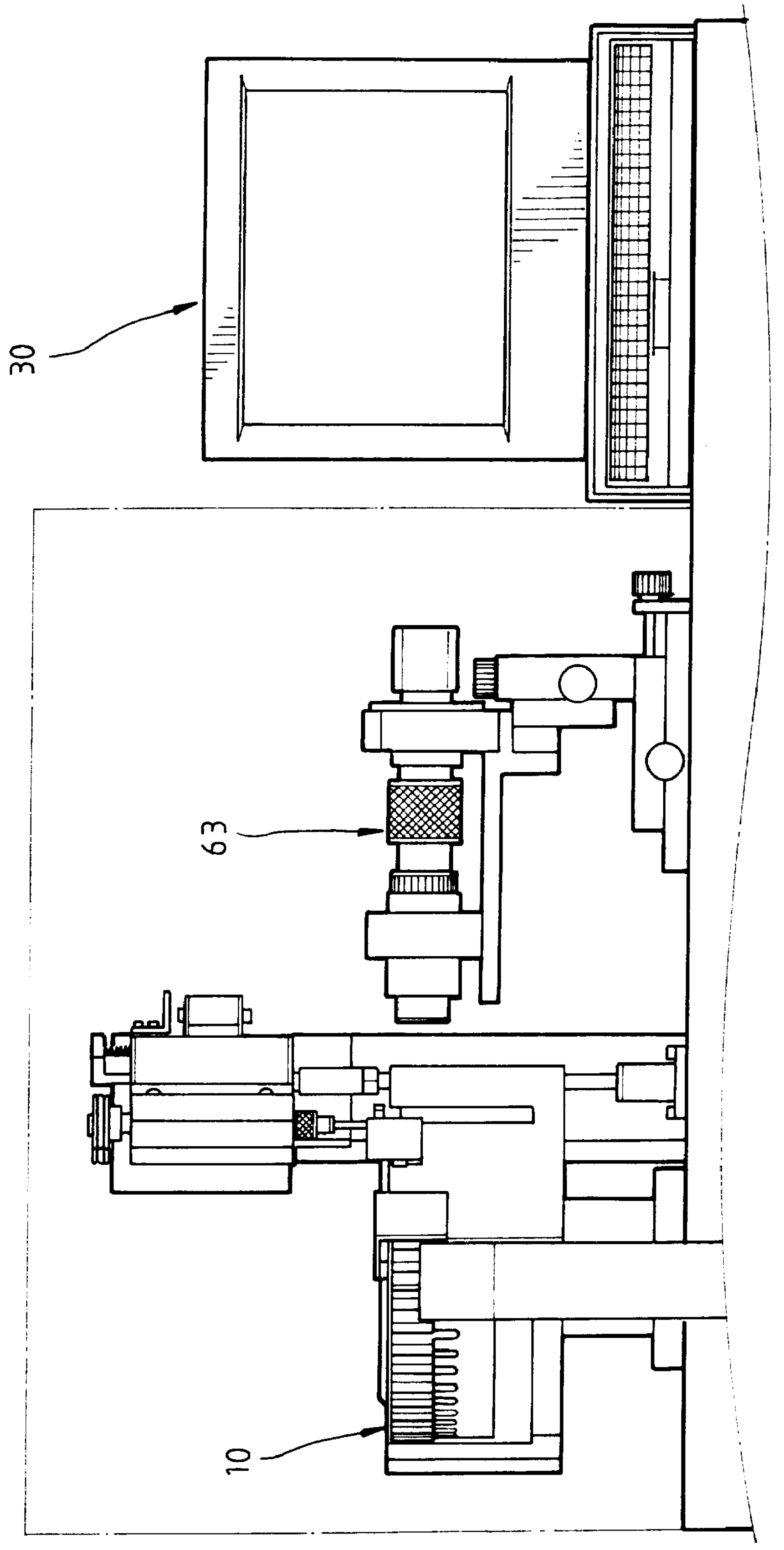
FIG. 1 is a schematic view of the present invention.
Figure 2:
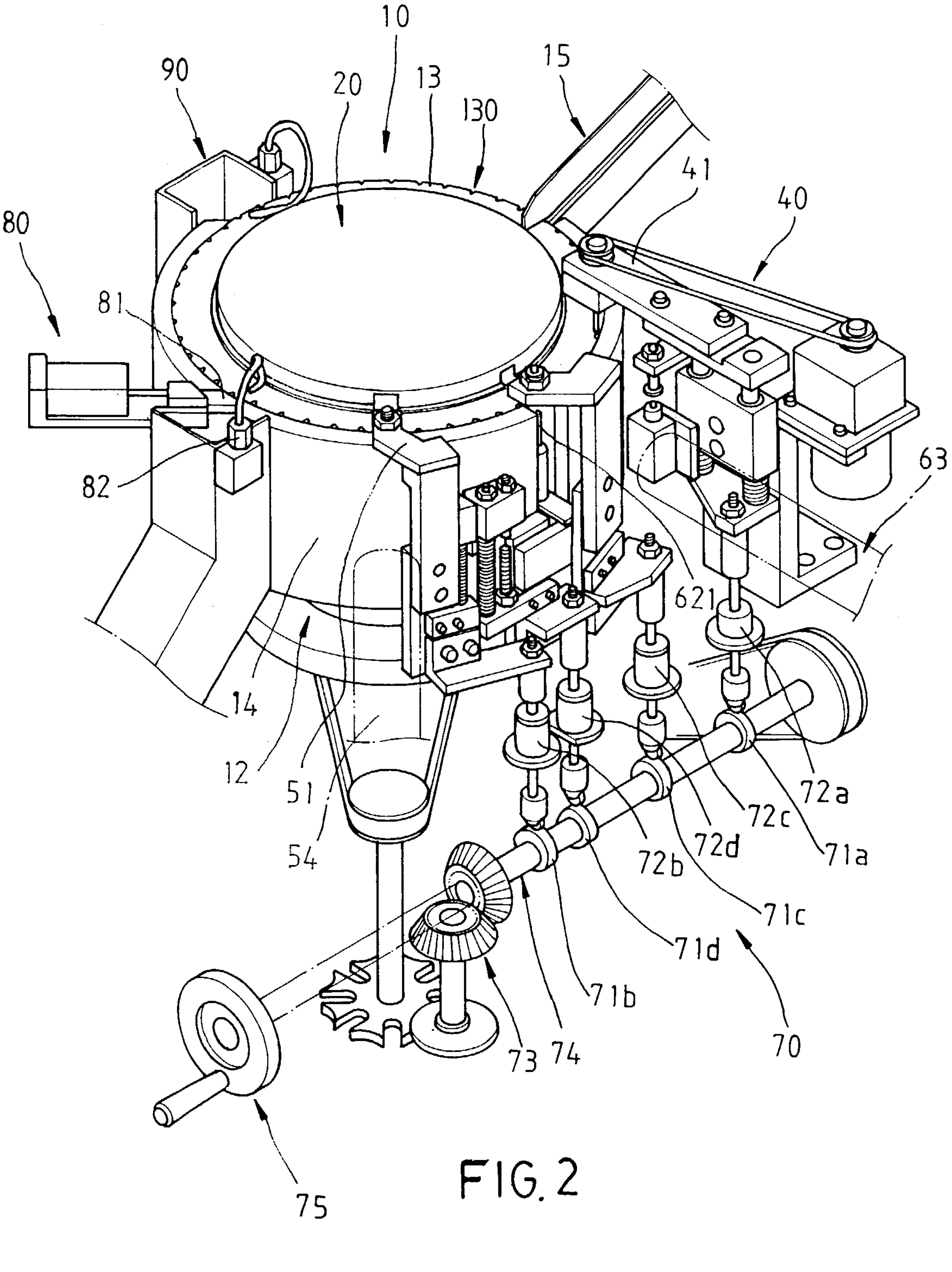
FIG. 2 is a perspective view of the present invention.
Figure 3:
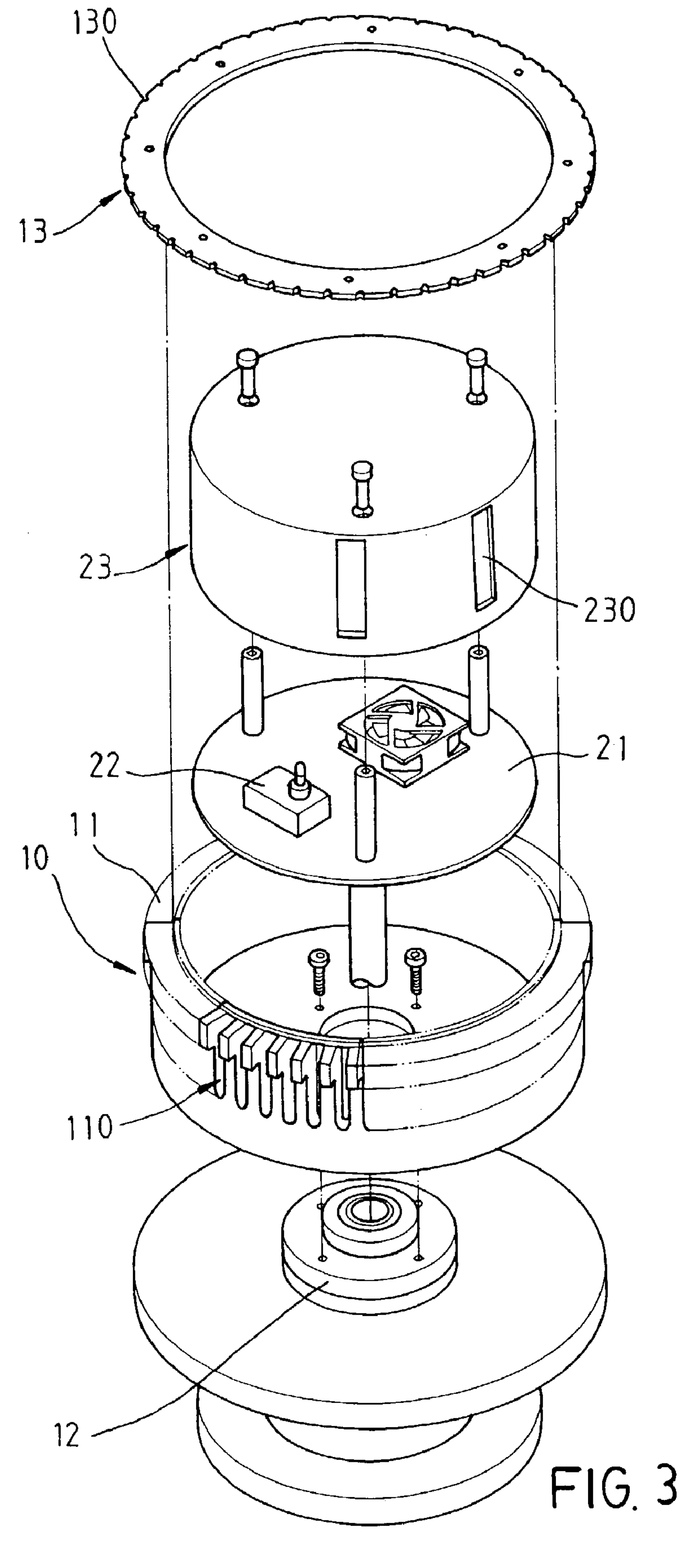
FIG. 3 is an exploded perspective view of the present invention.

Referring to FIGS. 1 to 3, the screw auto-detection and selection device of the present invention is illustrated. The screw auto-detection and selection device comprises the following components.

A rotary machine table 10 serves for moving screws through a plurality of detecting units around the rotary machine table 10. Then, a material removing means 80 serves to remove undesired screws. The qualified screws are collected in the collector by a material collecting means 90.

A light source generating unit 20 is firmly secured at the center of the rotary machine table 10 for providing back light in camera detection.

A recording control unit 30 serves as a microcomputer. A recorder serves to record the position of each screw being detected. The detecting result of each screw passing through each detecting unit is recorded so as to determine qualified screws and unqualified screws.

A screw pinhole detecting unit 40 (the pinhole S2 is a slit in a nut S1 for receiving a screw opener) is installed at an edge of the rotary machine table 10 for measuring the depth of the pinhole S2 of the nut S1. The detecting result is sent back to the recording control unit 30.

A nut height and width detecting unit 50 is installed at the edge of the rotary machine table 10 for measuring the height and width of the nut S1 of the screw S. The detecting result is sent back to the recording control unit 30.

A camera detecting unit 60 is installed at the edge of the rotary machine table 10 for measuring the length S3 of the screw S and determining the thread pitch. Then the detecting result is sent to the recording control unit 30.

A time scale cam unit 70 serves for driving all the detecting units for measuring and determination.

The rotary machine table 10 includes a rotary seat 11 (referring to FIG. 3), a driving shaft 12 for driving the rotary seat 11; and a dispatching disk 13 fixing to the rotary seat 11. A center of the rotary seat 11 is hollow and a periphery of the rotary machine table 10 has a plurality of slits 110 which are arranged with an equal space. The dispatching disk 13 has a plurality of notches 130 disposed corresponding to the slits. The dispatching unit 130 rotates with the rotary seat 11. An outer casing 14 is arranged at outer peripheries of the rotary seat 11 and the dispatching disk 13 for shielding the notches 130 of the dispatching disk 13. The outer casing has a feed opening. Screws S are fed into the slits 110 to of the rotary seat 11 from the feed opening of the casing by using a feeder 15 (for example, a vibrating feeder). The threads of the screw S are engaged to the notch 130 of the dispatching disk 13. The nut S1 exposes above the dispatching disk 13. With the rotation of the rotary machine table 10, the screw S clamped by the notches 130 and the casing 14 moves through the detecting units along the periphery of the rotary machine table 10. Unqualified screws are removed by the material removing means 80 at edge of the casing 14. the qualified screws are fed into the collector by the material collecting means 90 at the edge of the casing 14.

The light source generating unit 20 is firmly secured to the center of the rotary seat 11. The light source generating unit 20 has a carrier 21, a light source 22 (for example, a bubble) installed on the carrier 21; and a mask covering the light source 22. The mask 23 has radiating holes 230 passing through the mask 23. Thereby, light from the light source 22 will pass through the holes 230 to a passing screw S for capturing the image of the screw.

Figure 4B:
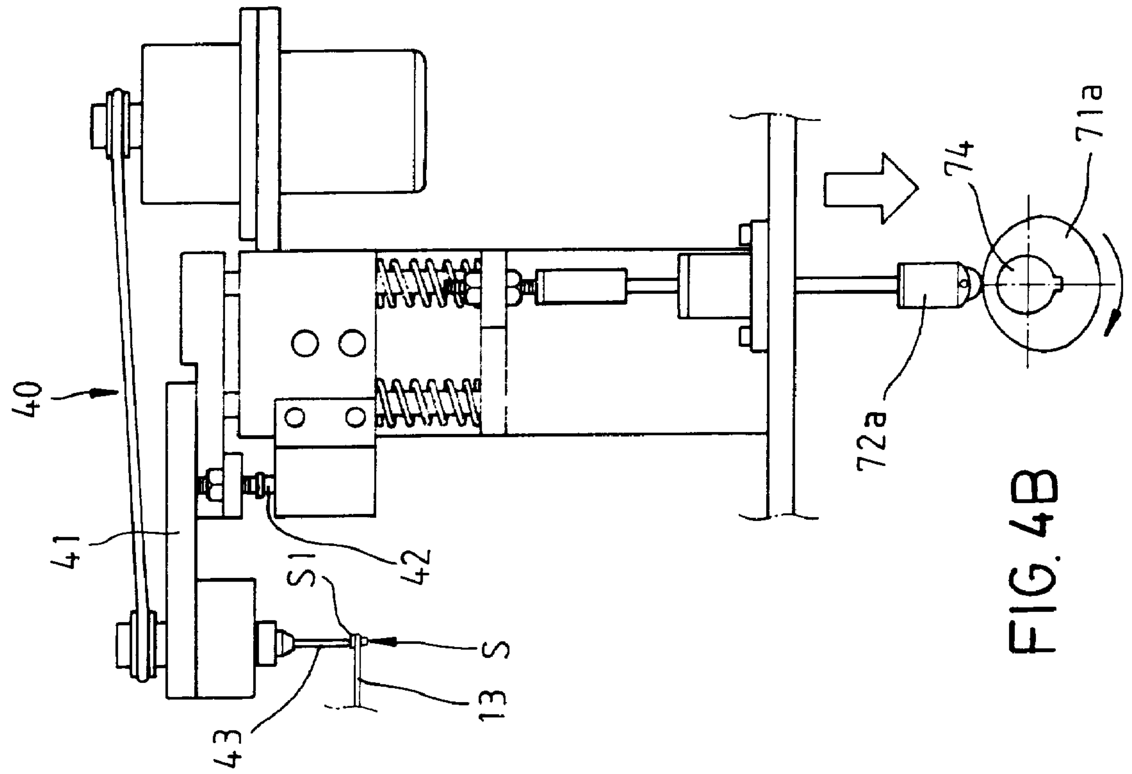
FIGS. 4A and 4B show the structure and operation of the pinhole depth detecting unit of the present invention.
Figure 4A:
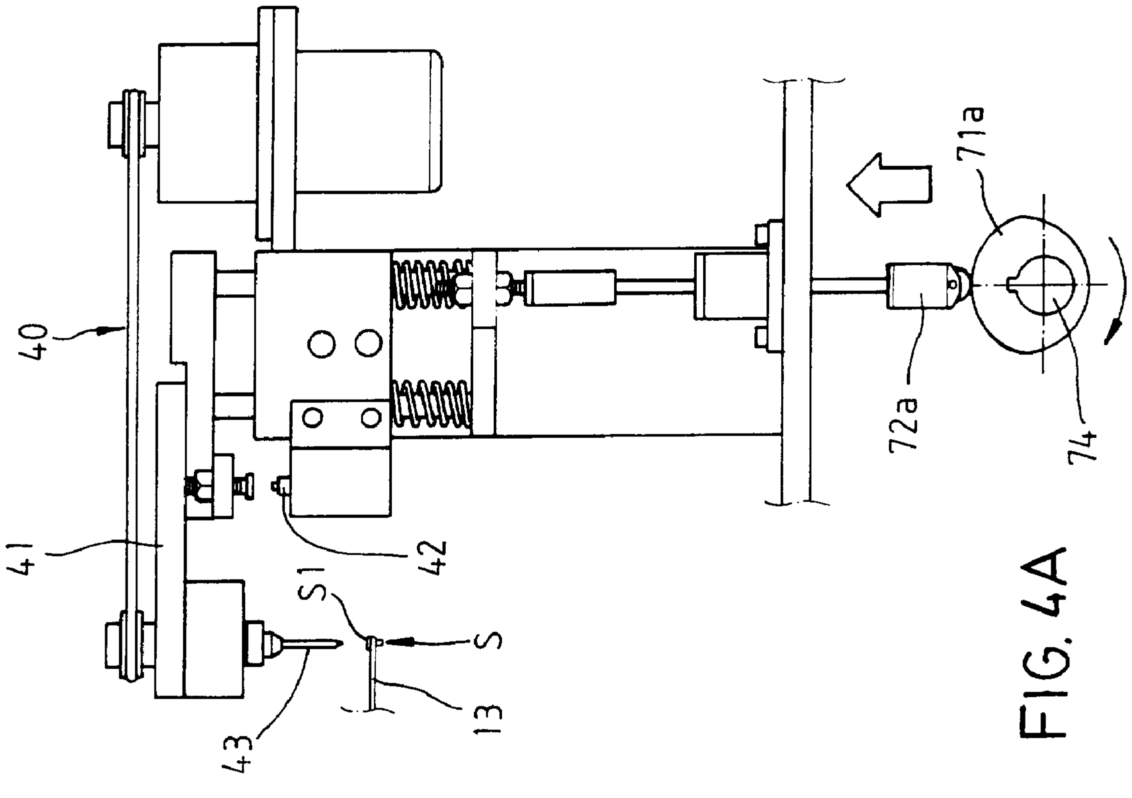

The pinhole depth detecting unit 40 (referring to FIG. 4A) includes a probe moving arm 41 and a switch 42 which can be triggered by the probe moving arm 41. The probe moving arm 41 extends to be above the notch 130 of the dispatch disk 13. A distal end of the probe moving arm 41 has a depth probe 43. The probe moving arm 41 can drive the tip end of the depth probe 43 to pierce into the pinhole S2 of the nut S1 (so called pinhole is a slit on the nut S1). When the depth of the pinhole S2 has arrived a standard value, the insertion depth of the depth probe 43 is sufficient for the downward movement of the probe moving arm 41 to trigger the switch 42 (referring to FIG. 4B) for sending a signal representing a qualified check. On the contrary, when the depth of the pinhole S2 is not sufficient to match the standard requirement. The downward movement of the probe moving arm 41 will stop when the depth probe 43 has reached to the bottom of the pinhole S2 and thus it can not trigger the switch 42. Thereby, the recording control unit 30 will record that the depth check of the screw S is not qualified.

Figure 5A:
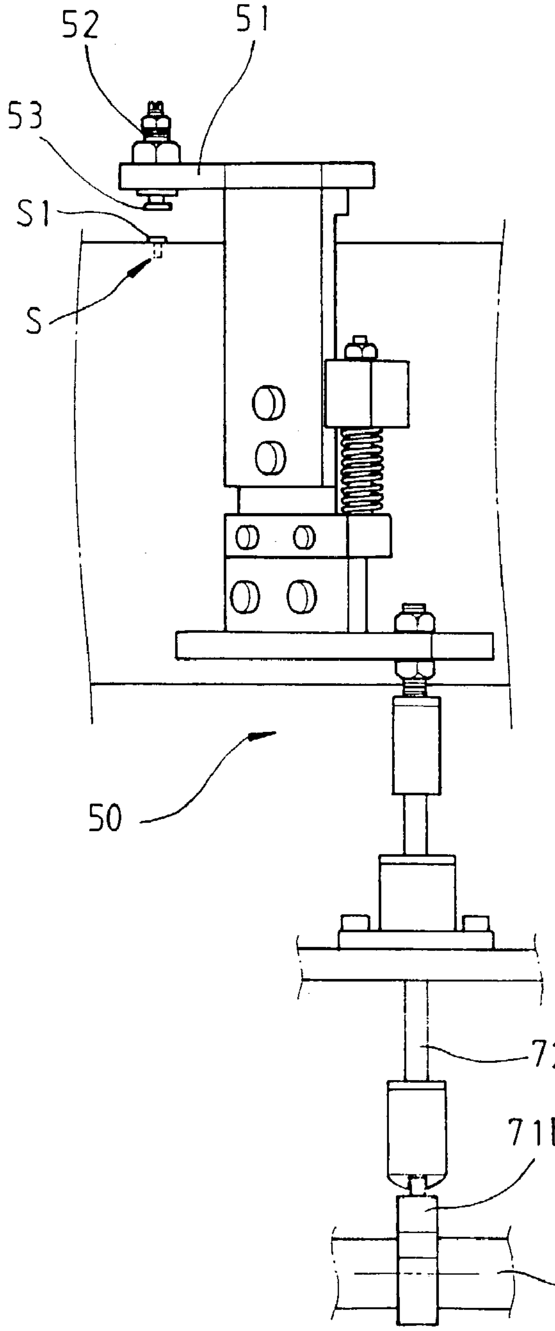
FIGS. 5A and 5B show the structure and operation of the nut height and width detecting unit of the present invention.
Figure 5B:
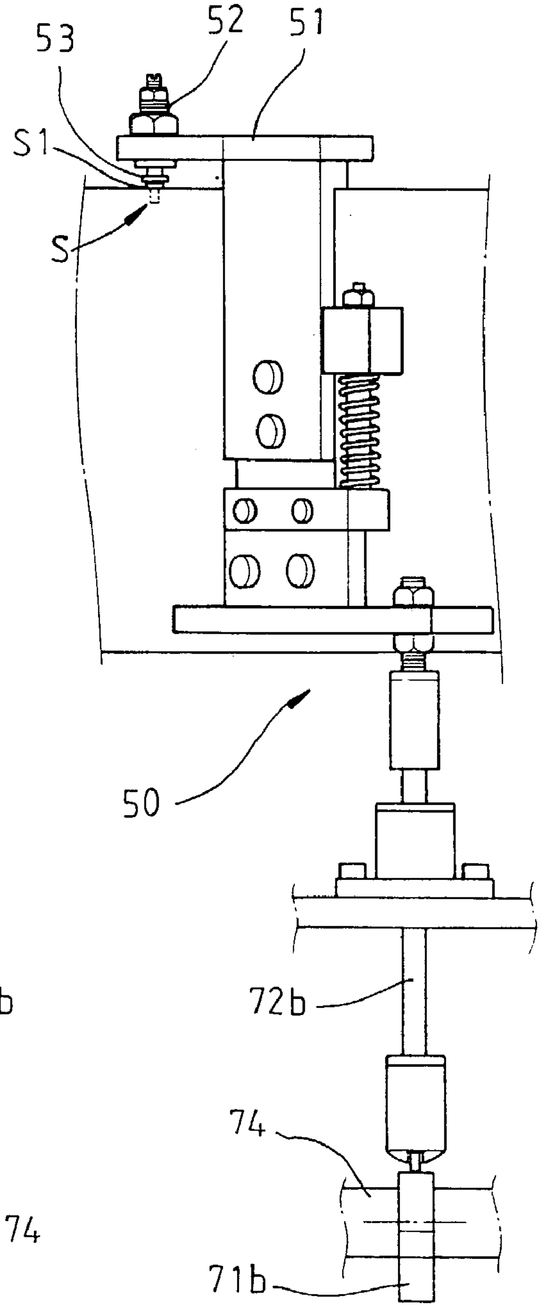
Figure 5C:
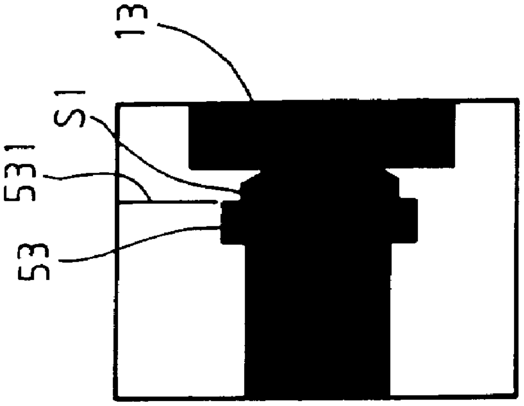
FIG. 5C show the analyzed result in detecting the height of a screw according to the present invention.

The nut depth and width detecting unit 50 (referring to FIG. 5A) includes a probe arm 51, a traveling adjuster 52, a positioning plate 53 connected to the bottom of the traveling adjuster 52 and a first camera detector 54. The probe arm 51 is driven by the time scale cam unit 70 (will be further described hereinafter) so as to drive the positioning plate 53 to move downwards. Thereby, the positioning plate 53 moves approach to the nut S1 protruded from the dispatch disk 13 of the rotary machine table 10 and presses against the top of the nut S1. The downward travel is determined by the traveling adjuster 52. In practical, the traveling adjuster 52 is a stud screwing to the probe arm 51. The positioning plate 53 is installed to the stud. By rotating the stud, the predetermined position of the positioning plate 53 is adjustable. In detection, by predetermined data about the height and width of the nut S1 inputted to the recording control unit 30, above said first camera detector 54 serves to capture the state of the screw S to be measured and then the measured data is sent to the recording control unit 30 for determining whether the screw is qualified. Especially, the detection of the height of the nut S1 is positioned by descending the positioning plate 53 (referring to FIG. 5B) to resist against the nut S1 so as to form a detection base line 531 (referring to FIG. 5C). Thus, the distance between the top of the nut S1 and the dispatching disk 13 is used to determine whether the height of the nut S1 matches a standard value. The recording control unit 30 analyzes the data from the first camera detector 54 for determining whether the screw is qualified.

Figure 6C:
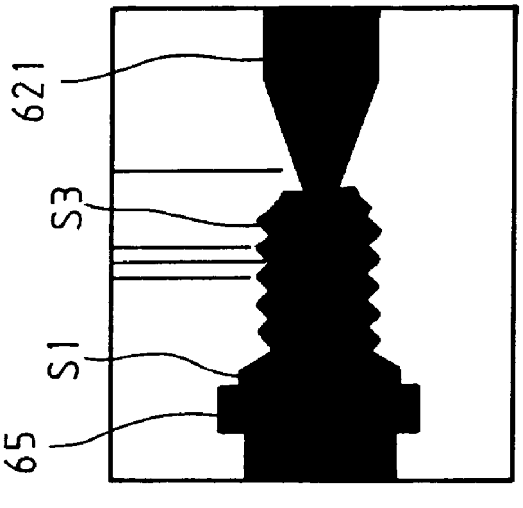
FIG. 6C shows a captured image of a screw according to the invention.
Figure 8:
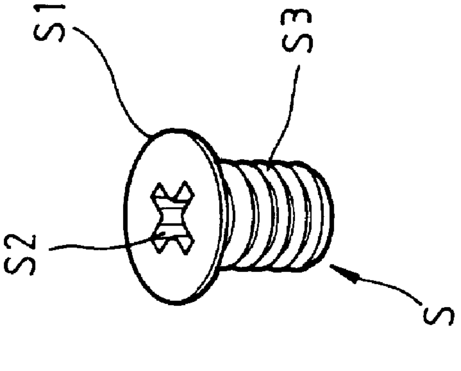
FIG. 8 is a perspective view of screw.
Figure 6A:
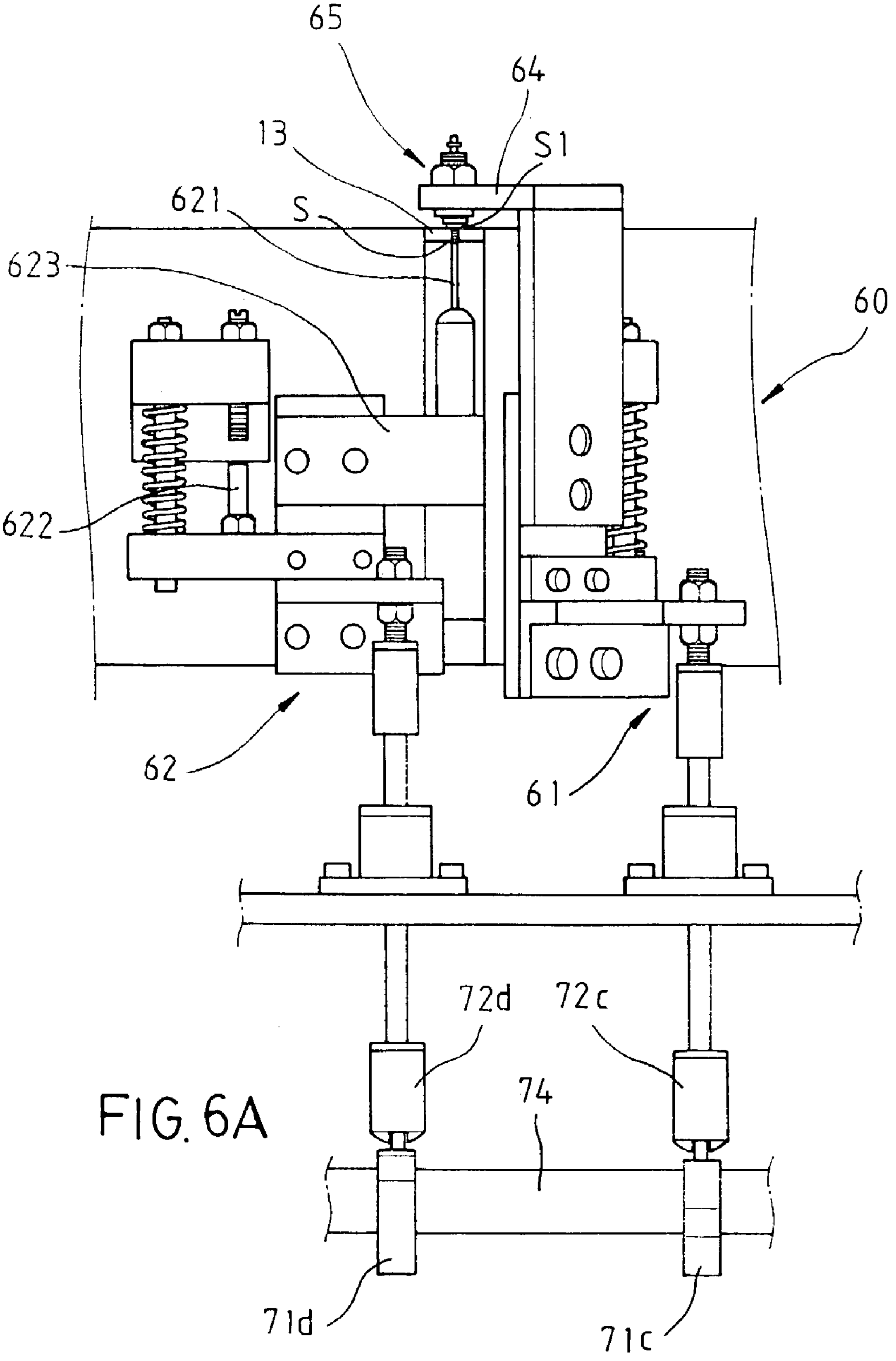
FIGS. 6A and 6B show the structure and operation of the camera detector of the present invention.
Figure 6B:
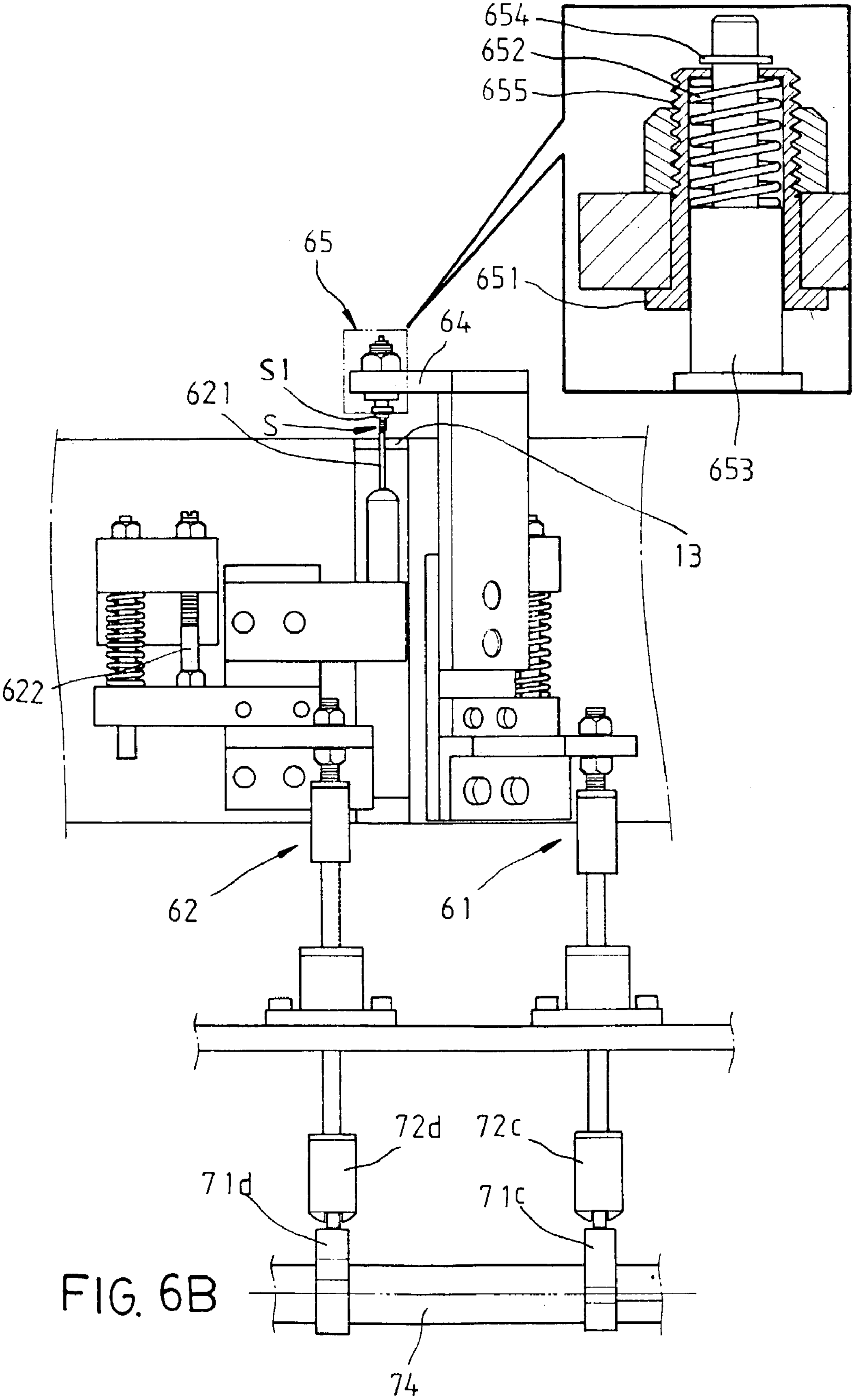

The camera detecting unit 60 includes a press means 61, an ejecting means 62 and a second camera detector 63 (the position of the second camera detector 63 is shown in FIG. 2). The press means 61 has a press arm 64 extending above the notch 130 of the dispatching disk 13 and an elastic press 65 installed at a predetermined position of the press arm 64. The ejecting means 62 has an ejecting pin 621 and a movement limiting unit 622 for ejecting a screw pressed by the press arm 64. The press arm 64 will drive the elastic press 65 to move downwards and press upon the nut S1 of the screw S. When the elastic press 65 presses the nut S1 of the screw S (referring to FIG. 6A), the ejecting pin 621 will move upwards along the slit 110 of the rotary seat 11. Furthermore, the elastic force of the elastic press 65 applies a pressure to the screw S toward the ejecting pin 621. Then, the screw S is retained in a tight state (referring to FIG. 6B). Even the screw S is ejected by the ejecting pin 621 to be out of the notch 130 of the dispatching disk 13, the ejecting pin 621 will still not loose. When the ejecting pin 621 ejects the screw S out of the notch 130 of the dispatching disk 13, the supporting frame 623 supporting the ejecting pin 621 will be hindered by the movement limiting unit 622 and-thus does hot move upwards further. The aperture of the second camera detector 63 is aligned to the illumination hole 230 of the light source generating unit 20. The ejecting means 62 is exactly positioned between the second camera detector 63 and the radiating hole 230. The light emitting from the radiating hole 230 is used as a back light. Then the second camera detector 63 can capture the projecting image the screw S. Then the size of the screw S can be determined by optical means, such as whether the threaded pitch or the length of the screw S matches a standard value.

The elastic press 65 includes a hollow helical tube 651,a compressible spring 652 in this helical tube 651, and a plug 653 inserting into the threaded tube 651. The compressible spring 652 retains a force to press the plug 653 downwards so as to provide a force and elasticity to the plug 653 for pressing the screw S. A top of the plug 653 has a protruded rib 654 for preventing the plug 654 to leave from the threaded tube 651. The threads of threaded tube 651 screws with the press arm 64. By rotating the screw tube 651, the position of the elastic press 65 is adjusted for pressing the nut S of the screw The time scale cam unit 70 (referring to FIG. 2) has a plurality of coaxial cams 71*a* to 71*d* for driving a plurality of cam cranks 72*a* to 72*d*. These cam cranks 72*a* to 72*d* are connected to the probe moving arm 41 of the pinhole depth detecting unit 40 (referring to FIG. 4) the probe arm 51 of the nut height and width detecting unit 50 (referring to FIG. 5), and a press means 61 and the ejecting means 62 of the camera detecting unit 60 (referring to FIG. 6) for driving the detecting units for measuring the screw S. The time scale cam unit 70 is driven by a driver, such as a motor (not shown). An umbrella 73 thereof serves to interact with the driving shaft 12 of the rotary seat 11. Thereby, the screw S enters into the rotary seat 1 can be transferred through each detecting unit. Thereby, the cams 71*a* to 71*d* will drive the related detecting units to operate. One end of the cam shaft 74 of the cams 71*a* to 71*d* can be installed with a manual rotary wheel 75. Thereby, when the detecting unit adjusts the time sequence, the power for testing can be provided manually.

Figure 7A:
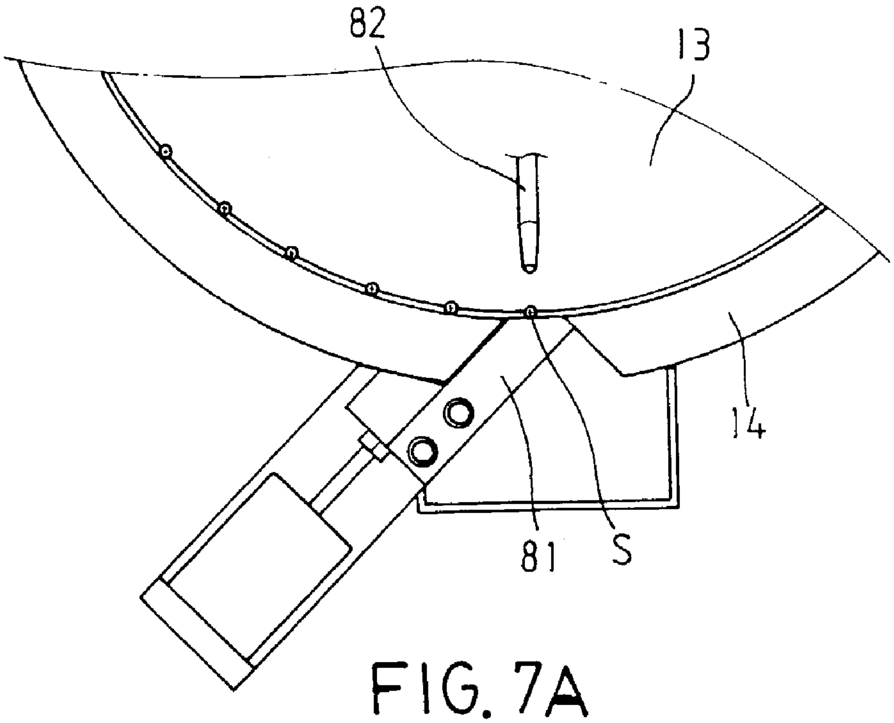
FIGS. 7A and 7B show the structure and operation of the material removing means and material collecting means of the present invention.
Figure 7B:
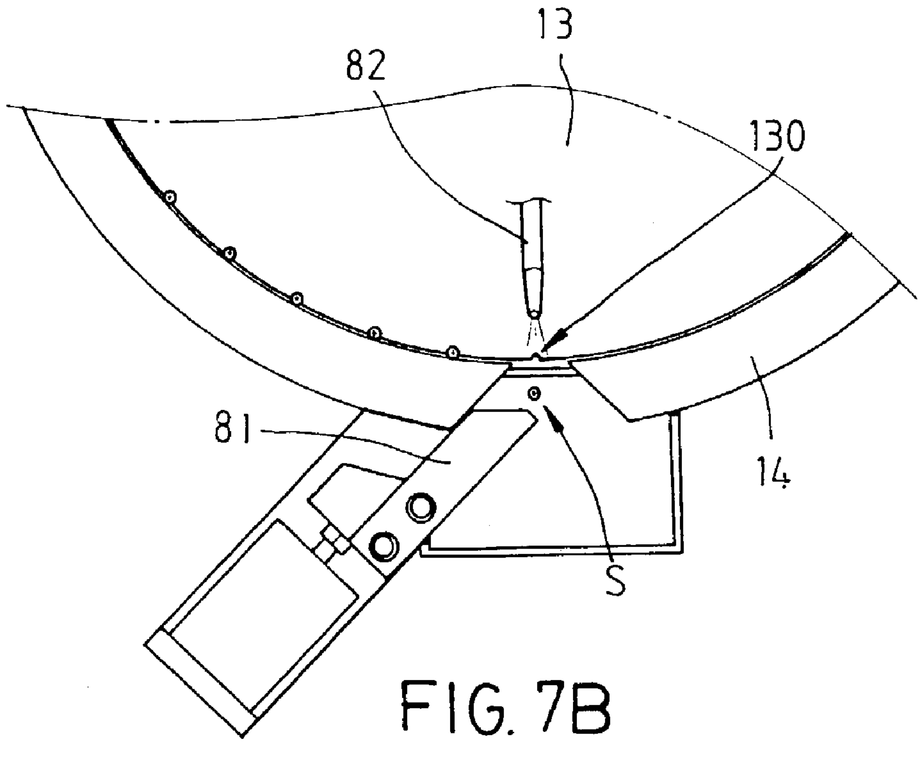

In the present invention, the material removing means 80 and material collecting means 90 can be the same means (referring to FIG. 7A and FIG. 7B). In the present invention, the material removing means 80 is used as an example, the material removing means 80 includes the following elements.

A retracting knife 81 is installed at the edge of the rotary machine table 10 and a front end of the retracting knife 81 resists against the notch 130 of the dispatching disk 13. When the screw S moves with the notch 130, the retracting knife 81 retracts from the notch 130 of the dispatching disk 13 under the control of the recording control unit 30.

A spray nozzle 82 is installed at a-front end of the retracting knife 81 when the retracting knife 81 lefts from the notch 130 of the dispatching disk 13, air can be sprayed out. Then the screw S on the notch 130 will blow out of the dispatching disk 13 (referring to FIG. 7B). Then the screw S falls into a material removing tube to a container.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A screw auto-detection and selection device comprising:

a rotary machine table for moving screws through a plurality of detecting units around the rotary machine table; then, a material removing means being used to remove undesired screws; the qualified screws being collected in the collector by a material collecting means;

a light source generating unit firmly secured at the rotary machine table for providing back light in camera detection;

a recording control unit for recording the position of each screw being detected; the detecting result of each screw passing through each detecting unit being recorded so as to determined qualified screws and unqualified screws;

a camera detecting unit being installed at an edge of the rotary machine table for measuring the length of the screw and determining the thread pitch; then the detecting result being sent to the recording control unit;

a time scale cam unit for driving all the detecting units for measuring and determination;

characterized in that:

the camera detecting unit includes a press means, an ejecting means and a second camera detector; the press means has a press arm extending above the notch of the dispatching disk and an elastic press installed at a predetermined position of the press arm; an ejecting means has an ejecting pin and a movement limiting unit for ejecting a screw pressed by the press arm so that the screw is aligned to a radiating hole of the light source generating unit.

2. The screw auto-detection and selection device as claimed in claim 1, wherein the rotary machine table includes a rotary seat, a driving shaft for driving the rotary seat; and a dispatching disk fixing to the rotary seat; a center of the rotary seat is hollow and a periphery of the rotary machine table has a plurality of slits which are arranged with an equal space; the dispatching disk has a plurality of notches disposed corresponding to the slits; the dispatching unit rotates with the rotary seat; an outer casing is arranged at outer peripheries of the rotary seat and the dispatching disk for shielding the notches of the dispatching disk for fixing the screw in the notch.

3. The screw auto-detection and selection device as claimed in claim 1, wherein the material removing means includes:

a retracting knife installed at the edge of the rotary machine table and a front end of the retracting knife resists against the notch of the dispatching disk; wherein when the screw moves with the notch, the retracting knife retracts from the notch of the dispatching disk under the control of the recording control unit; and a spray nozzle being installed at a front end of the retracting knife wherein when the retracting knife lefts from the notch of the dispatching disk, air will be sprayed out; then the screw on the notch will blow out of the dispatching disk; then the screw falls into a material removing tube to a container.

4. The screw auto-detection and selection device as claimed in claim 1, wherein the light source generating unit has a carrier, a light source installed on the carrier; and a mask covering the light source; the mask has radiating holes passing through the mask; thereby, light from the light source will pass through this holes to a passing screw for capturing the image of the screw.

5. The screw auto-detection and selection device as claimed in claim 1, further comprising a pinhole depth detecting unit; a pinhole depth detecting unit being installed at an edge of the rotary machine table for measuring the depth of the pinhole of the nut; the detecting result being sent back to the recording control unit; and the pinhole depth detecting unit comprising: a probe moving arm and a switch which can be triggered by the probe moving arm; wherein the probe moving arm extends to be above the notch of the dispatch disk; a distal end of the probe moving arm has a depth probe; the probe moving arm can drive the tip end of the depth probe to pierce into the pinhole of the nut.

6. The screw auto-detection and selection device as claimed in claim 1, further comprising: a nut height and width detecting unit being installed at an edge of the rotary machine table for measuring the height and width of the nut of the screw; the detecting result being sent back to the recording control unit;

the nut height and width detecting unit includes a, probe arm, a traveling adjuster, a positioning plate connected to the bottom of the traveling adjuster and a first camera detector; the probe arm is driven by the time scale cam unit so as to drive the positioning plate to move downwards; thereby, the positioning plate moves approach to the nut protruded from the dispatch disk of the rotary machine table and presses against the top of the nut; the downward length is determined by the traveling adjuster.

7. The screw auto-detection and selection device as claimed in claim 6, wherein the traveling adjuster is a stud screwing to the probe arm and the positioning plate is installed to the stud.

8. The camera detector as claimed in claim 1, wherein the elastic press includes a hollow helical tube, a compressible spring in this helical tube, and a plug inserting into the threaded tube; the compressible spring retains a force to press the plug downwards so as to provide a force and elasticity to the plug for pressing the screw.

9. The screw auto-detection and selection device as claimed in claim 1, wherein the time scale cam unit has a plurality of coaxial cams for driving a plurality of cam cranks; these cam cranks are connected to the probe moving arm of the pinhole depth detecting unit, the probe arm of the nut height and width detecting unit, and the press means and ejecting means of the camera detecting unit for driving the detecting units to measure the screw.

* * * * *